Feb. 17, 1931.  E. O. ELLIOTT  1,793,388
LOCOMOTIVE TRUCK
Filed Feb. 17, 1930  2 Sheets-Sheet 1

Inventor:—
Edward O. Elliott
by his Attorneys

Inventor:-
Edward O. Elliott
by his Attorneys

Patented Feb. 17, 1931

1,793,388

UNITED STATES PATENT OFFICE

EDWARD O. ELLIOTT, OF JENKINTOWN, PENNSYLVANIA

LOCOMOTIVE TRUCK

Application filed February 17, 1930. Serial No. 429,111.

My invention relates to locomotive trucks of the two-wheel type, in which the bearings for the axles of the truck are on the inner side of the wheels. Trucks of this type have a radius bar and are pivoted so as to swing to a limited extent.

One object of the present invention is to improve the construction of the frame of the truck by making the frame in the form of a housing, and to suspend the springs from the upper portion of the housing, the springs in turn supporting the center pin of the truck, the housing and the radius bar being cast in one piece.

A further object of the invention is to make the casings for the roller-bearings an integral part of the frame.

Figure 1:
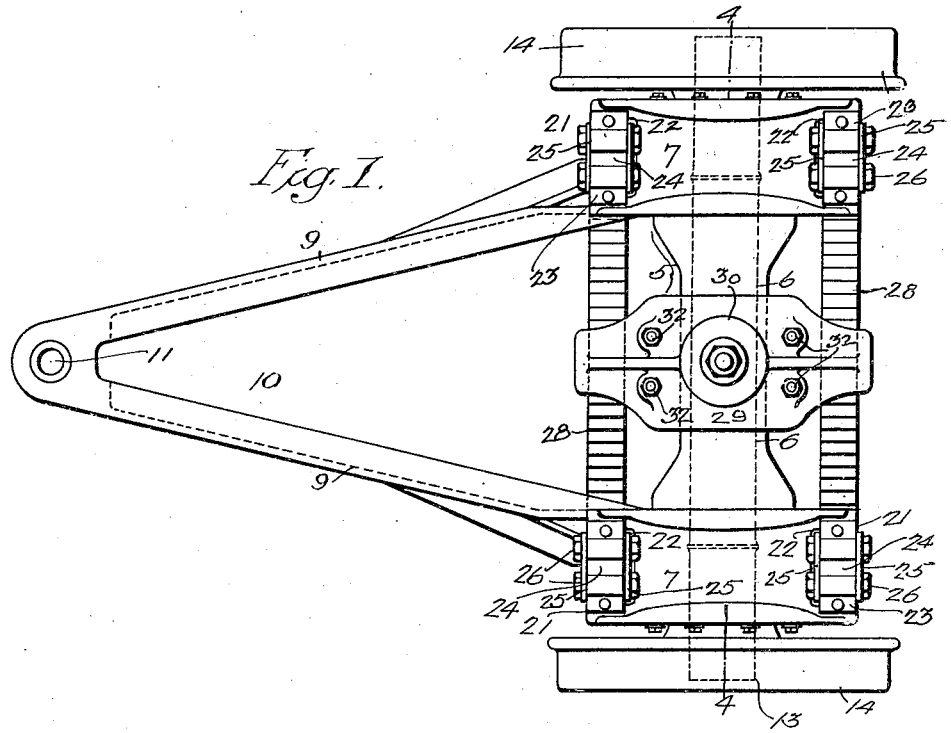
Fig. 1 is a plan view of a two-wheel truck of the type described above and illustrating my invention.
Figure 2:
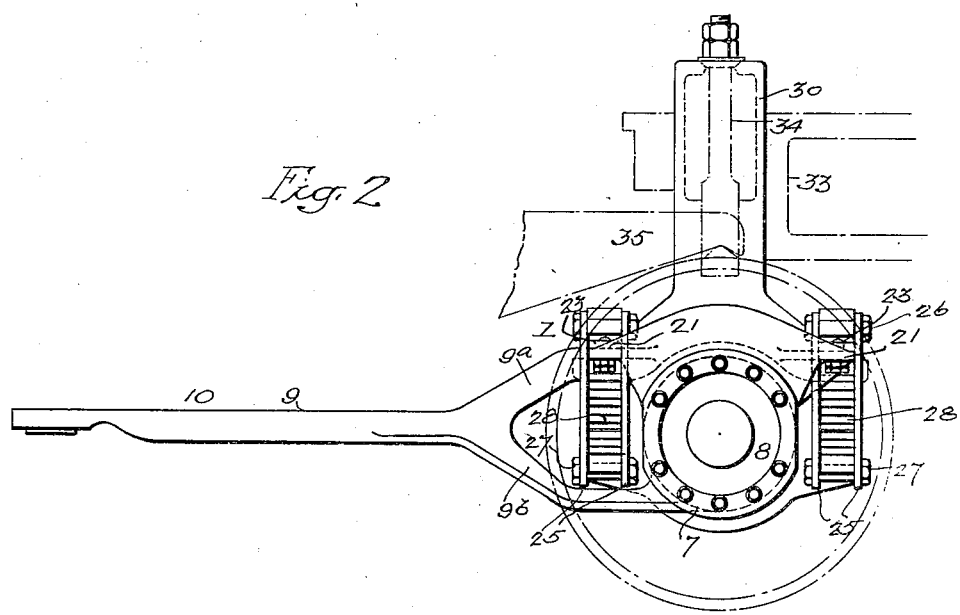
Fig. 2 is a side view with the wheel removed.

Referring to the drawings, the frame 5 of the truck is made as an integral casting and consists of a transverse housing 6, which extends from one side of the truck to the other. The housing is enlarged so as to form casings 7 for the roller-bearings 8. The radius bar 10 consists of two members 9—9, which radiate from a center 11, in which is the pivot bearing for the truck. The members 9 are integrally connected with the casings 7 of the frame. Each member 9 is forked (see Fig. 2), one fork 9a extending to the upper portion of the casing 7 of the housing, while the other fork 9b extends to the lower portion of the casing 7. Thus the lower portions 9b of the radius bar not only reinforce the members 9 of the radius bar but also act to reinforce the casings.

Figure 3:
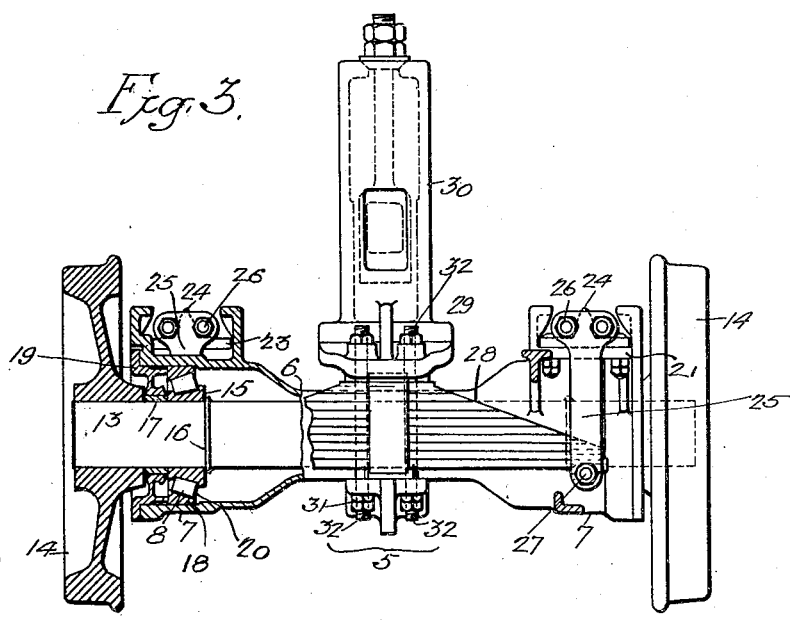
Fig. 3 is an end view, partly in section.
Figure 4:
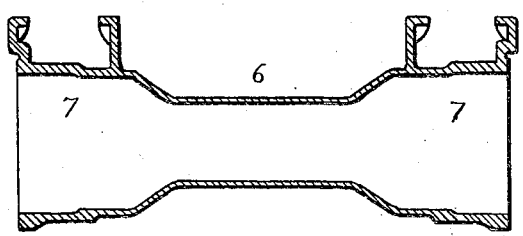
Fig. 4 is a sectional view of the housing on the line 4—4, Fig. 1.

13 is an axle which extends through the housing and has wheels 14 at each end beyond the frame of the truck. The roller-bearings for the axle in this instance are constructed as shown in Fig. 3. The inner raceway 15 of each roller-bearing is mounted on the axle and is held between the shoulder 16 on the axle and a sleeve 17, which extends between the inner raceway and the hub of the wheel 14. The outer raceway 18 is held in place within the casing 7 of the housing by the inwardly extending portion of a cap 19. The rollers 20 are located between the inner and outer raceways. The cap 19 fits the sleeve 17, which is mounted on the axle and acts as a closure for the ends of the housing. It will be noticed that the two casings 7 are of greater diameter than the housing, and this construction allows lubricant to be placed in the lower portions of the casings to lubricate the roller-bearings. While a certain form of roller-bearing is illustrated, it will be understood that other types of roller-bearings may be used without departing from the essential features of the invention.

Projecting from the upper end of the housing above the casings for the bearings are brackets 21. These brackets are slotted at 22. Mounted on the brackets are blocks 23, each block having a center rib 24. Suspended from each block is a pair of links 25, suspended from two pins 26, one being located on one side of the center rib 24 of the block and the other on the opposite side thereof. By this construction the links can swing on either journal. One of each pair of links extends through the slot 22 in the bracket 21 and the two links of each set are connected at their lower ends by a pin 27, and resting on the two pins 27 at each side of the housing is a plate-spring 28, each spring being connected to the bolster 29, to which is secured the center pin 30. Clamp plates 31 extend under the springs and are secured to the bolster 29 by vertical bolts 32. The center pin 30 is mounted in a bearing 33, forming part of the cross-tie of the locomotive structure. Suspended from the upper end of the center pin 30 is a link 34 and the lower end of this link is engaged by an equalizing lever 35, and the proportion of the weight which the truck is to carry is transmitted through this equalizing lever. It will be seen by the above construction that a comparatively light truck can be made which will be very substantial.

The axle extends entirely through the housing and is mounted on roller-bearings in the casings at the end of the housing, while the springs are carried by links which are allowed to swing on integral brackets projecting from each end of the housing. These brackets are at the upper part of the housing, consequently, the links can be long. This construction allows the springs to be located above the line of the lower portion of the housing. The housing is reinforced at each end by the lower members 9b of the radius bar, which is an integral part of the casting.

I claim:—

1. A frame of a two-wheel swing-truck made in a single casting and consitsing of a cylindrical housing having enlarged cylindrical casings at each end for axle bearings; a radius bar having two members, one member extending from one end of the housing and the other extending from the other end of the housing, both members of the bar uniting at a pivot bearing; an integral brace extending from each member of the radius bar to the underside of the casings of the housing; and laterally extending brackets projecting from each side of the housing and also formed integral with said housing.

2. The combination in a two-wheel swing-truck, of an integral casting consisting of a cylindrical transverse housing, arranged to entirely enclose the axle, said housing being enlarged at each end to form a casing for roller-bearings; an integral radius bar extending from the casing; integral brackets formed on the casing and projecting from each side thereof; links suspended from said brackets; springs carried by the links, one spring being on one side of the housing and the other spring being on the opposite side thereof; a longitudinal bolster secured to the springs; and a center pin projecting from the bolster.

EDWARD O. ELLIOTT.